Aug. 25, 1970   M. J. DEMO   3,525,214
PISTON-CYLINDER COMBUSTION, GAS TURBINE ENGINE
Filed May 31, 1968   4 Sheets-Sheet 1

INVENTOR.
MAX J. DEMO
BY Fulwider, Patton, Rieber,
Lee, and Utecht
ATTORNEYS

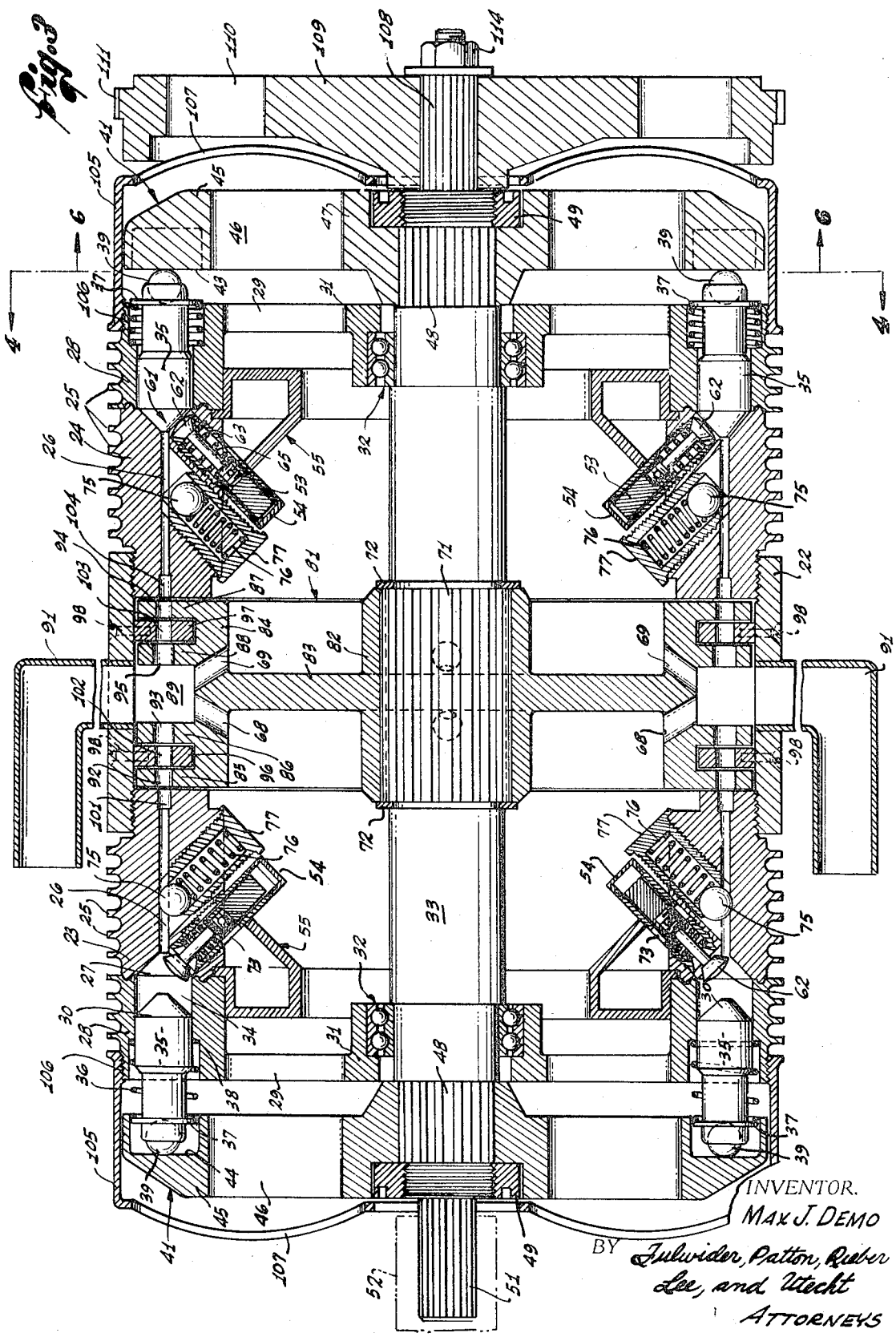

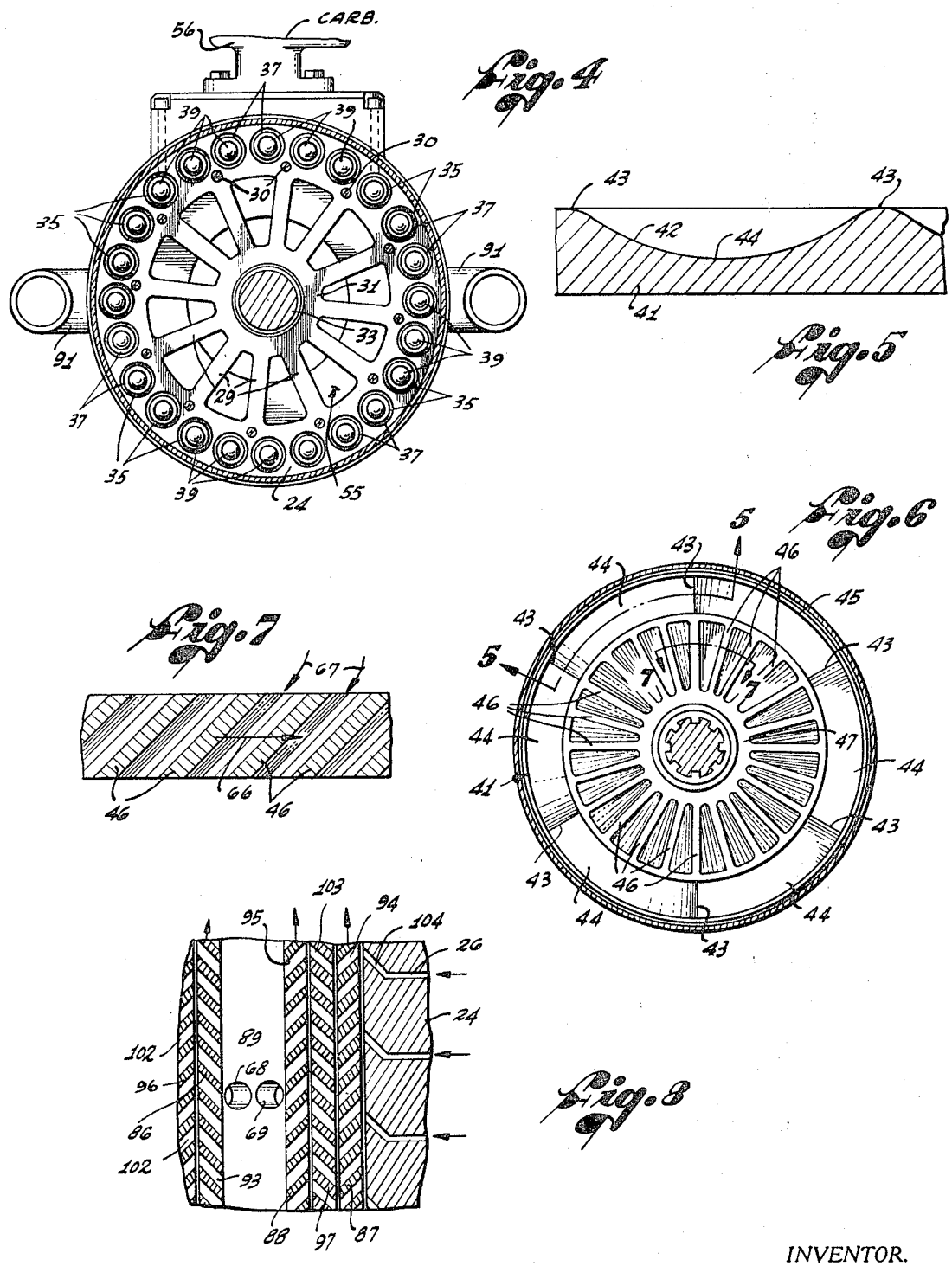

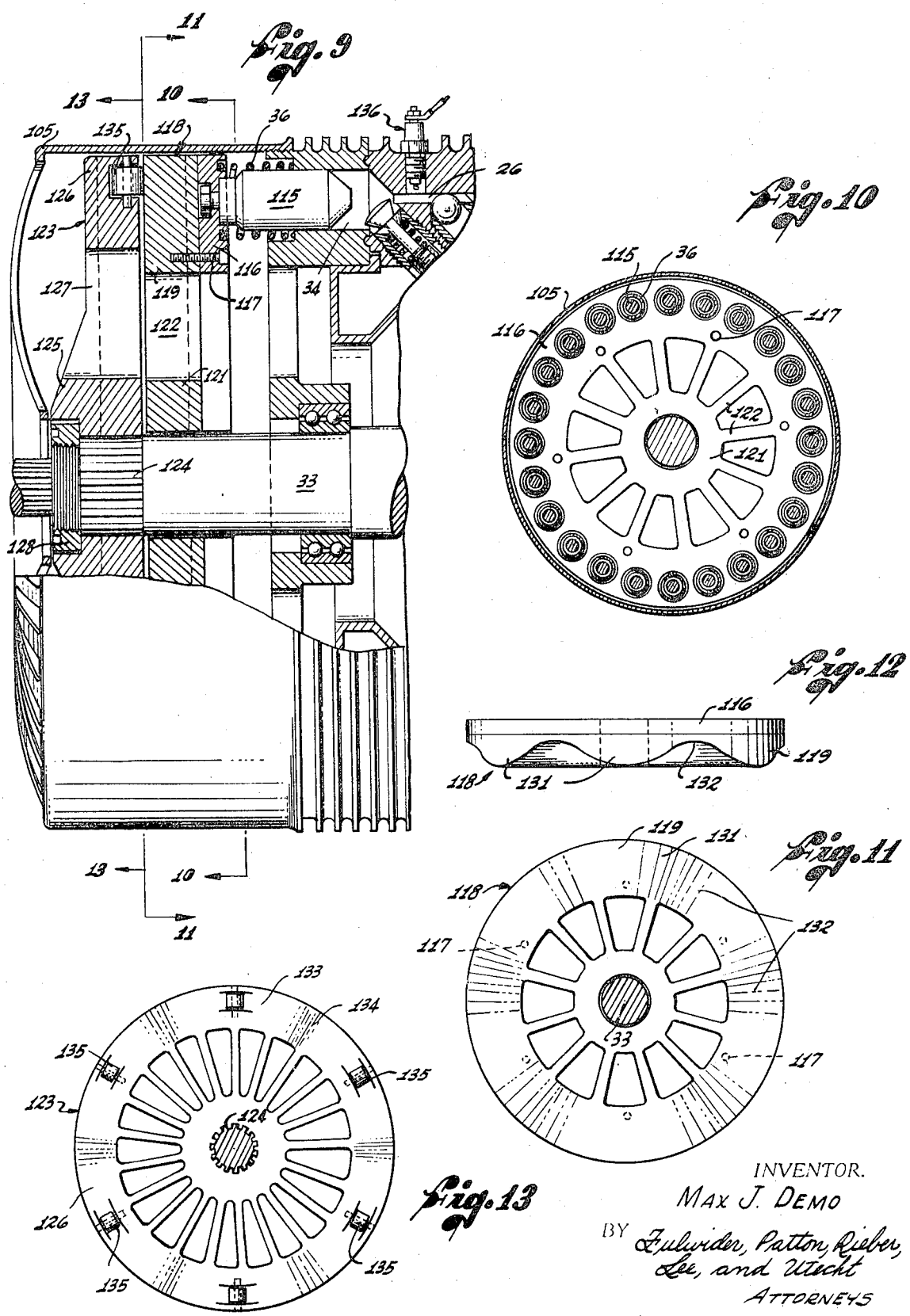

United States Patent Office

3,525,214
Patented Aug. 25, 1970

3,525,214
PISTON-CYLINDER COMBUSTION,
GAS TURBINE ENGINE
Max J. Demo, 18069 Coastline Drive, 17,
Malibu, Calif. 90265
Filed May 31, 1968, Ser. No. 733,504
Int. Cl. F01k 23/14
U.S. Cl. 60—13                                    10 Claims

ABSTRACT OF THE DISCLOSURE

A gas turbine engine having a centrally arranged turbine wheel mounted on an operating shaft and having turbine passages adjacent its periphery. The operating gas is produced in a plurality of piston-cylinder combinations in which a fuel-air mixture is compressed and burned, and the combustion products exhausted to the turbine passages. The pistons are driven in the compression stroke by means rotated by the engine shaft. The fuel-air mixture is sucked into the cylinders and the exhaust of combustion gases effected at a predetermined pressure past check valves. The piston-cylinder combinations are disposed annularly, concentric with the engine shaft, at opposite ends of the engine.

BACKGROUND OF THE INVENTION

The present invention is in the field of gas turbines where fuel is burned with compressed air and the products of combustion directed through passages of a rotary turbine to produce mechanical work at the turbine shaft.

Gas turbine engines are well known in the prior art, both with and without mechanically driven compressors, and with mechanical compressors driven by the turbine itself. Conventionally, the fuel is injected into the compressed air downstream of the compressor and, after burning, the products of combustion are directed to the turbine passages and vanes to provide mechanical energy at the turbine shaft. The compressors may be positive displacement, centrifugal, or axial flow but they are all generally characterized by the injection of fuel into the air after it has been compressed. This, of course, means that the fuel itself must be under pressure and presents problems of mixture of the fuel with the compressed air and the complete burning of the fuel in the limited space available before its direction into the turbine passages. These prior art constructions have been bulky, complex and expensive, disadvantages which are, to a large extent, significantly decreased in the gas turbine engine of the present invention where the fuel is mixed with air prior to compression in piston-cylinder combinations in which the compressed fuel-air mixture is also burned to produce high pressure and temperature working gases.

SUMMARY OF THE INVENTION

The present invention is directed to a gas turbine engine in which high pressure and temperature gas jets are directed at annular turbine passages to produce high torque and energy in a small and compact engine. The gas is produced by combustion of a fuel-air mixture which is compressed and burned in piston-cylinder combinations. The pistons and cylinders are relatively small in size and large in number, and located annularly concentric with the turbine shaft, with movement of the pistons in at least the compressing direction positively effected as an incident to rotation of the turbine shaft.

In its retracting movement, the piston sucks a fuel-air mixture into the cylinder chamber much like a mechanical internal combustion engine and, in its compression stroke, compresses the fuel-gas mixture to a point where it is ignited either spontaneously by diesel action, or by a conventional spark plug if desired. The burning compressed fuel-air mixture is retained in the cylinder until its pressure reaches a value high enough to open a check valve, whereupon a jet of highly compressed, heated gas is ejected into the turbine passages.

The relatively large number of pistons may be operated in any desired sets, for example, four, six or all at the same time, their jets being conducted individually to the turbine passages. The operation brings fuel and air into the piston-cylinder combination at relatively low pressure, compresses the mixture and burns it to attain a very high pressure which in turn opens a check valve to direct a high pressure and temperature jet into the turbine passages.

The output of the engine is greatly increased by placing a set of annular piston-cylinder combinations at each end of the engine, directing their jets toward a central turbine therebetween. Each end set of piston-cylinder combinations may feed through multiple turbine passage arrangements into a central peripheral exhaust passage which finally exhausts to atmosphere.

The inlet valves to the cylinders may be opened by vacuum therein, or may be positively opened by a cam and follower arrangement. The output valve is automatically operated at a predetermined pressure. The full movement of the pistons in the compressing direction effectively scavenges the products of combustion from the cylinders in preparation for a return suction stroke. The pistons do no mechanical work, but only function to supply jets of high pressure and temperature gases directed to the turbine passages. The pistons are connected by cam plates and followers to be operated from the turbine shaft, but do not return direct mechanical energy to the shaft.

The construction provides a high energy output engine of great compactness, using a conventional vacuum-manifold fuel feed and without requiring high pressure injection into compressed air. The combustion gases from the cylinders are fed to the turbine in the form of high frequency jets of high temperature and pressure directed into the turbine passages.

Other objects and features of the invention will be apparent to those skilled in the art from the following specification and the appended drawings.

DESCRIPTION OF THE DRAWINGS

FIG. 3 is a longitudinal sectional view through the engine of this invention;

FIG. 4 is a transverse sectional view on the line 4—4 of FIG. 3;

FIG. 5 is an enlarged partial sectional view on the line 5—5 of FIG. 6;

FIG. 6 is a transverse sectional view on the line 6—6 of FIG. 3;

FIG. 7 is an enlarged partial view on the line 7—7 of FIG. 6;

FIG. 8 is an enlarged partial sectional view through the turbine passages and nozzles;

FIG. 9 is a partial longitudinal sectional view of a modified form of the invention;

FIG. 10 is a reduced transverse sectional view on line 10—10 of FIG. 9;

FIG. 11 is a reduced transverse sectional view on line 11—11 of FIG. 9;

FIG. 12 is a side elevational view of the piston supporting plate and cam of the embodiment of FIG. 9; and FIG. 13 is a reduced transverse sectional view on line 13—13 of FIG. 9.

DESCRIPTION OF THE PREFERRED EMBODIMENTS

Figures 1, 2:
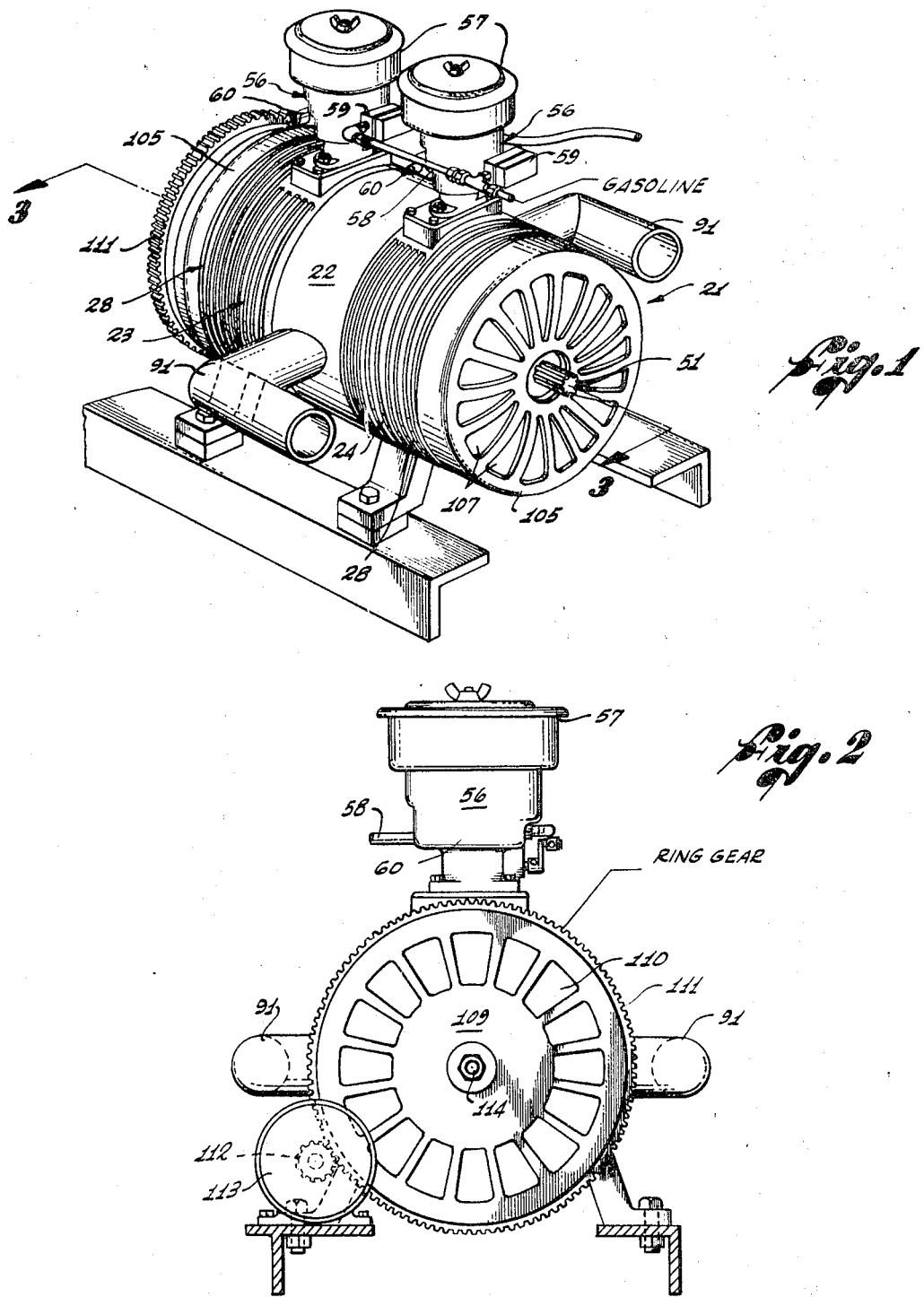
FIG. 1 is a perspective view of a gas turbine engine according to the present invention.
FIG. 2 is an end elevational view of the engine of FIG. 1.

Referring first to the exemplification of the invention shown in FIGS. 1–9, the gas turbine engine 21 comprises a central cylindrical housing band 22 having screwed into its outer ends a pair of annular body sections 23 and 24 having annular cooling fins 25 on their peripheries. In each of the body portions 23 and 24 are annularly arranged, axially extending exhaust passages 26, the outer ends of which communicate with conical recesses 27 in the outer end faces of the body sections. Against the outer end faces of the body sections 23 and 24 are bolted end body rings 28 forming continuations of the body sections 23 and 24 and rigidly bolted thereto. The end rings 28 are connected by ribs or spokes 29 to central hubs 31 within which bearings 32 support the engine shaft 33.

Within the end rings 28 are annularly arranged, cylindrical bores 34 concentric with the axis of shaft 33 and communicating with the conical openings 27 and bores 26 in the body sections 23 and 24. The cylindrical bores 34 form the cylinders of the piston-cylinder combinations of the engine, and are of any desired number, being shown as twenty-four at each end of the engine.

In each of the cylinders 34 is disposed a reciprocating piston 35 having a conical end 30 substantially fitting the recess 27 to effectively eject substantially all the combustion gases from the cylinders. Each piston is biased to retracted position by a compression spring 36 acting against a washer 37 on the piston and an abutment 38 in a counterbore in the outer end of the cylinder 34. In the outer end of each piston 35 is seated a ball 39 which acts as a cam follower for the cam surface on the adjacent cam wheel 41, the surface being shown at 42 in FIG. 5 as providing nodes 43 and valleys 44 facing the pistons, the nodes and valleys being of any desired number to produce the desired number of firings of the piston-cylinder combinations, the embodiment selected for illustration showing six such nodes and valleys on each cam wheel 41.

The cam surfaces 42 are located on the inner faces of the peripheral annular portions 45 of the cam wheels 41 which are connected by inclined vane spokes 46 to central hubs 47 rigidly mounted on splines 48 on the shaft 33 and held thereon by nuts 49. The end 51 of the shaft 33 is likewise splined to provide a power takeoff to a utilization device connection 52. It will be understood that the construction of the cylinders 34, pistons 35, cam follower balls 39, and cam wheel plates 41, while shown duplicated at opposite ends of the engine in FIG. 3, could be used in a single end, rather than a double end, array. However, the double end array gives a high power engine in a relatively compact space.

Each end array of piston-cylinder combinations is provided with an intake manifold 55 fed in conventional manner through a carburetor 56 having an air intake at 57 and a gasoline feed at 58 to a float bowl 59. The cylinders 34 of each end array are connected to their associated intake manifold 55 through individual intake valves 61. The intake valves 61 comprise conical heads 62 sealing in complementary seats in valve bodies 63 and biased into sealing position by compression springs 64. The heads 62 of the intake valves are integral with stems 65 threaded into plungers 53 which are freely slidable axially within the valve bodies 63. The ends of the valve bodies are sealed by caps 54 and their interiors connect to the manifolds 55 through openings 73. When a vacuum is drawn in a cylinder 34 by its retracting piston 35 the associated valve 61 opens to suck the fuel-air mixture from the manifold 55 through the opening 73 and the interior of the valve body 63 into the cylinder. This is shown by the piston-cylinder combinations at the left in FIG. 3. When the piston 35 starts their compression strokes the valves 61 close immediately to prevent return flow of the fuel-air mixture.

Each exhaust passage 26 in the body sections 23 and 24 is normally closed by a check ball 75 extending thereacross under the bias of a spring 76 held within a cup-shaped retainer 77 screwed within a complementary opening in the body sections 23, 24. The check balls 75 thereby constitutes automatic exhaust valves for the combustion gases from the cylinders 34 whereby to remit sharp jets of high pressure, high temperature gas from the cylinders into the turbine passages.

Rigidly mounted on a central spline 71 on shaft 33 is the turbine wheel 81 of the engine, having a hub portion 82 mounted on the spline 71 between snap rings 72 and supporting, through a web 83, an outer cylindrical portion 84. Integral with the outer cylindrical portion 84 are outwardly extending turbine rings of any desired number, here shown paired for each end array of piston-cylinder combinations, at 85, 86 and 87, 88. Between the turbine rings 86 and 88 is an annular, peripheral, exhaust chamber 89 communicated through openings in the central housing band 22 and exhaust pipes 91 to atmosphere. In the turbine rings 85–88 are turbine passages 92–95, respectively (FIGS. 3 and 8). Between the turbine rings 85 and 86 is a stationary ring 96 bolted at 98 to the inner face of the band 22. Between the turbine rings 87 and 88 is a stationary ring 97 like-wise bolted at 98 to the band 22. The stationary rings 96 and 97 have nozzle passages 102 and 103 therethrough. The inner ends of exhaust passages 26 communicate with stationary nozzle passages 101 and 104 inclined in the direction of travel of the turbine wheel periphery, as shown in FIG. 8. The stationary nozzle passages 102 and 103 incline in the same direction as the nozzle passages 101 and 104, while the turbine passages 92 and 95 incline opposite to their cooperating nozzle passages, also as shown in FIG. 8. The size of the passages preferably increases as energy is extracted from the combustion gases in the following manner: taking the left end feed to the turbine wheel, the nozzle passage 101 is larger in cross-sectional area than the exhaust passage 26; the turbine passage 92 is larger in cross-sectional area than the nozzle passage 101; the nozzle passage 102 is the same size as the turbine passage 92; the turbine passage 93 has a larger cross-sectional area than the nozzle passage 102.

The vane spokes 46 of the cam plate 41 are inclined in the direction of rotation represented by the arrow 66 so as to draw air interiorly of the engine, as indicated by the arrows 67 in FIG. 7. This is cooling air which is inducted into each end of the engine by the vanes 46 thereat, passes between the spokes 29 to the turbine wheel 81 and thence through openings 68 and 69 on opposite sides of the web 83 into the peripheral exhaust chamber 89 and through the exhaust pipes 91 to atmosphere. This air 67 is cooling air which cools the interior of the engine and passes therethrough not only by the fan action of the spoke vanes 46 but also by the centrifugal action of the turbine wheel in ejecting the cooling air through the passages 68, 69. The openings 68, 69 may be of any desired number commensurate with the strength of the turbine wheel and the volume of cooling air desired.

The opposite ends of the engine 21 are provided with shrouds 105 located outside the cam wheels 41 and threaded at 106 on the body rings 28 which contain the cylinders 34. The shrouds 105 have openings 107 for the passage of cooling air drawn therethrough by the vanes 46.

The end of shaft 33 opposite the power takeoff 51 is splined at 108 to receive a ring gear 109 having gear teeth at 111 adapted to be meshed with a pinion gear 112 driven through a conventional engaging and disengaging drive by an electric starter motor 113. The ring gear 109 is maintained on the shaft 33 by an end nut 114 and has openings 110 therethrough for the passage of cooling air.

In the exemplification of the invention illustrated in FIGS. 1–8, there are twenty-four piston-cylinder combinations in each end array. Each cam wheel 41 has six nodes thereon whereby each piston undergoes six fuel-mixture compression strokes for each revolution of the shaft 33. With twenty-four piston-cylinder combinations in each end array, this means one hundred forty-four firings for each end array, or a total of two hundred eighty-eight firings per shaft revolution for the double-ended engine. These firings are conducted in groups of six piston-cylinder combinations in each end array, spaced 60° apart around the annulus in which the cylinders are arranged. Preferably the cam plates 41 at the opposite ends of the engine are offset 7½° on the shaft 33 so that the six piston-cylinder combinations firing at one end of the engine will be timed intermediate the sets of six firing at the opposite end of the engine. Viewing the engine as a whole, this means that at each 7½° rotation of the shaft 33, a set of six piston-cylinder combinations is firing.

The exemplification of the engine illustrated in FIGS. 1-8 is of the simplest diesel form without glow plugs or spark plugs, although it will be understood that glow plugs may be used to facilitate starting for diesel operation, as illustrated in FIG. 9 modification, and that spark plugs for each cylinder may be used if it is desired to time the ignition point more accurately. However, since there is no mechanical connection to be driven by the pistons 35, the simple diesel operation is not only adequate but desirable for simplicity and the range of fuels which may be utilized in the engine.

To start the engine, the starter motor 113 is energized from an electrical source, not shown, and this engages the starter pinion gear 112 with the teeth 111 of the ring gear 109, thereby rotating the shaft 33. With continued operation, the temperature within the cylinders 34 rises sufficiently for diesel operation to start with spontaneous combustion of the fuel-air mixture as its temperature is further raised by the compression strokes of the pistons 35 driven by the cam wheels 41, the nodes 43 at each end of the engine driving six of the pistons 35 to a full compression stroke each 15° rotation of the shaft 33. Even without ignition, the pressure in the cylinders 34 finally rises so high at the end of the compression stroke that the balls 75 are displaced and the fuel-air mixture ejected, without effect, through the exhaust passages 26. Outward movement of the pistons 35 occurs under the influence of the springs 36 as the balls 39 follow the surfaces 42 into cam valleys 44. This outward piston movement creates a vacuum in the chambers 34 which opens the intake valves 61 to draw further fuel-air mixture into the cylinders.

Eventually, spontaneous ignition and diesel operation is effected within the cylinders 34 as the temperature therein rises, which ignition will thereafter occur toward the end of the compression stroke of the pistons 35. The exact point at which the ignition occurs is not particularly important since there is no mechanical connection to be driven in the working stroke of the pistons, they simply continue their compression stroke to finally scavenge all of the burned fuel-air mixture from the cylinders as the conical ends 30 of the pistons enter the conical depressions 27 in the end faces of the body sections 23 and 24. When ignition starts in any of the cylinders 34 of the engine, it will quickly come up to speed and cause ignition and diesel operation to occur in all of the other cylinders. This disconnects the starter pinion 112 in known manner, and thereafter the starter motor 113 is de-energized.

When ignition of the compressed fuel-air mixture occurs in the cylinders 34, the pressure therein is rapidly built up to a very high value which opens the check balls 75 against the bias of the springs 76, thereby ejecting jets of high pressure, high temperature gas through the exhaust passages 26. This ejection continues through the full compression stroke of the pistons 35, and at the end of the stroke the pistons retract under the action of the springs 36, the balls 75 close the passages 26, and a vacuum is created within the cylinders 34 which opens the intake valves 61 to communicate the cylinders with the associated intake manifold 55 and draw in a new charge of fuel-aid mixture during the retraction stroke of the piston. When a piston follower ball 39 passes through a cam valley 34, its piston starts a compression stroke which immediately closes the valve 61 and compresses the fuel-air mixture in its cylinder 34 until spontaneous combustion and diesel operation occurs to again eject a jet of high pressure, high temperature gas through the passage 26 past the check ball 75.

The jets of high pressure, high temperature gas from the cylinders 34 pass through exhaust passages 26 into directional nozzles 101 and 104 in the body sections 23 and 24, respectively. The nozzles 101 and 104 incline forwardly of the direction of rotation of the turbine rotor as shown more particularly in FIG. 8. The turbine passages 92 and 94 in the turbine rings 85 and 87 incline reversely to the adjacent stationary nozzles 101 and 104, considering the direction of flow of the high pressure gas jets. The resultant action on the surfaces of the turbine passages 92 and 94 exerts a torque on the turbine rings 85 and 87 in the direction of the arrows in FIG. 8. The gas jets leaving the turbine passages 92 and 94 then pass to oppositely inclined stationary nozzle passages 102, 103 in the stationary rings 96 and 97, respectively. The rotor rings 86 and 88 on the inside of the stationary rings 96 and 97 have their passages 93 and 95 inclined reversely to the nozzle passages 102 and 103, and in the same direction as the turbine passages 92 and 94, so that additional torque is exerted on the turbine rings 86 and 88 in the direction of the arrows in FIG. 8. The gas jets leaving the turbine passages 93 and 95 exhaust into the space 89 and thence through the exhaust pipes 91 to atmosphere. From an inspection of FIG. 8, it will be seen that, considering the direction of flow of the jets of combustion gases, the stationary nozzles 101–104 incline in the direction of rotation of the turbine wheel, while the turbine passages 92–95 incline opposite to the direction of rotation of the turbine wheel. The action of gas jets on the periphery of the turbine wheel produces driving forces which efficiently absorb the energy of the combustion gases.

It will be readily understood that while the intake valves 61 have been shown as opened by the vacuum created in the cylinders 34 by the retracting movement of the pistons 35, these valves can be cam-driven to open positions by rotary cams mounted on the shaft 33, in well known manner.

At the left-hand end of FIG. 3, the array of piston-cylinder combinations is shown adjacent the end of the retraction movement of the pistons 35, just prior to closing of the intake valves 61 and with the balls 39 of the two illustrated pistons (and four others as well at the same end) substantially in the valleys 44 of the adjacent cam wheel 41. At the right-hand end of FIG. 3, the piston-cylinder combinations are shown adjacent the end of the compression stroke, just prior to closing of the check balls 75, and with the balls 39 of the two illustrated pistons (and four others as well at the same end) in substantial engagement with the nodes 43 on the adjacent cam wheel 41.

A modification of the invention is illustrated in FIGS. 9–13, providing mechanism for operating all of the pistons in an end array simultaneously. That is, all of the piston-cylinder combinations at one end fire at the same time instead of six together as in the previous exemplification. This means that for each revolution of the shaft 33, all of the piston-cylinder combinations at one end of the engine fire simultaneously six times for the same total number of firings as in the previous embodiment, but in a differently phased arrangement. The construction of the parts of the engine not specifically referred to herein is the same as in the previous embodiment, with the same body sections and with twenty-four cylinders 34 in each end array.

The pistons of this modification are as shown at 115, all rigidly connected at their exterior ends to a ring 116 against which the springs 36 bear to apply a retracting bias to the ring and the pistons 115. The arrangement is duplicated in the array of piston-cylinder combinations at the opposite end of the engine. The ring 116 is rigidly bolted at 117 to a cam plate 118 having a peripheral annular portion 119 and an interior hub 121 interconnected by radially extending spokes 122 to provide spaces therebetween for the passage of cooling air.

A second cam plate 123 is disposed generally parallel to the cam plate 118, and is rigidly mounted on a spline 124 on the shaft 33 by a hub portion 125 connected to a peripheral annular portion 126 by inclined radial vanes 127 performing the fan or air-drawing function of the vanes 46 of the first embodiment. The cam plate 123 is maintained on the shaft 33 by a nut 128. The hub 121 of the cam plate 118 is freely slidable axially of the shaft 33 which is also freely rotatable therein.

The cam plate 118, as shown in FIGS. 11 and 12, has six nodes 131 and six valleys 132. The cam plate 123, shown in FIG. 13, likewise has six nodes 133 and six valleys 134. At the nodes 133 of the cam plate 123 are rollers 135 having their axes of rotation disposed radially of the shaft 33 and rolling along the camming surface of the cam plate 118 to effect axial reciprocating movement of the cam plate 118, the annular plate 116 and the pistons 115 mounted thereon. The operation of the engine is as previously described in the first embodiment, except that all pistons 115 in one end array operate simultaneously. Again, the cam plates at the opposite ends of the engine may optionally be circumferentially offset to have the firing operations of the piston-cylinder combinations at the opposite ends of the engine effected out of phase.

The exemplification of FIG. 9 shows a glow plug at 136 connected into an exhaust passage 26. This glow plug functions in well-known manner to facilitate the starting of the engine for diesel operation, after which the glow plug can be disconnected.

Where positive spark ignition is desired, a spark plug may be substituted for the glow plug 136 for each of the cylinders 34, and a suitable timer or distributor mounted on the shaft 33 to effect ignition at the desired point in the stroke of the pistons 115. Either the glow plug or spark plug arrangement may obviously be incorporated in the first exemplification of FIGS. 1–8.

While certain embodiments of the invention have been specifically illustrated and described, it is understood that the invention is not limited thereto, as many variations will be apparent to those skilled in the art.

I claim:
1. A gas turbine engine comprising:
a turbine wheel;
a shaft mounting said turbine wheel for rotation therewith;
a plurality of piston-cylinder combinations;
means driven by said shaft for effecting longitudinal movement of said pistons in said cylinders;
means supplying a fuel-air mixture to said cylinders;
exhaust passages leading from said cylinders to said turbine wheel;
means normally closing said exhaust passages and responsive to the high pressure of combustion gases fired in said cylinders for opening the passages to conduct jets of the combustion gases to the turbine wheel to effect rotation thereof;
direction nozzle passages connected to the ends of said exhaust passages and inclined toward the turbine wheel in the direction of rotation thereof;
said turbine wheel comprising at least a pair of peripheral members having turbine passages therethrough, a stationary member intermediate said peripheral members, passages through said peripheral and stationary members being inclined in the same direction as said nozzle passage, and the passages through said turbine peripheral members being inclined reversely thereto;
said turbine wheel including:
a second set of peripheral members spaced from the first recited at least a pair to form a peripheral exhaust chamber therebetween; and
a second set of piston-cylinder combinations at the opposite end of the engine from said first recited plurality of piston-cylinder combinations and having their exhaust passages feeding to the second set of peripheral members in a direction opposite to the feed of said first sets.

2. A gas turbine engine as defined in claim 1 including:
passages communicating the axially central portion of said engine with said peripheral exhaust chamber in the turbine wheel; and
means for deflecting cooling air through said axially central portion of said engine and exhausting it through said last-mentioned passages into the exhaust chamber.

3. A gas turbine engine comprising:
a turbine wheel;
a shaft mounting said turbine wheel for rotation therewith;
a plurality of piston-cylinder combinations;
means driven by said shaft for effecting longitudinal movement of said pistons in said cylinders;
means supplying a fuel-air mixture to said cylinders;
exhaust passages leading from said cylinders to said turbine wheel;
means normally closing said exhaust passages and responsive to the high pressure of combustion gases fired in said cylinders for opening the passages to conduct jets of the combustion gases to the turbine wheel to effect rotation thereof;
said piston-cylinder combinations being arranged annularly concentric with the axis of said shaft, the axes of said cylinders being parallel to said shaft axis;
a set of said annularly arranged piston-cylinder combinations at each end of the engine, said opposite end piston-cylinder combinations facing in opposite directions;
said turbine wheel being located generally centrally of said engine; and
said opposite end sets of piston-cylinder combinations feeding through their exhaust passages toward the centrally located turbine wheel.

4. A gas turbine engine as defined in claim 3, including:
cooling air passages through the axially central portion of said engine; and
means for inducting cooling air through said axially central portion of said engine from both ends of the engine and exhausting it with the exhaust from said turbine wheel.

5. A gas turbine engine comprising:
a turbine wheel;
a shaft mounting said turbine wheel for rotation therewith;
a plurality of piston-cylinder combinations;
means driven by said shaft for effecting longitudinal movement of said pistons in said cylinders;
means supplying a fuel-air mixture to said cylinders;
exhaust passages leading from said cylinders to said turbine wheel;
means normally closing said exhaust passages and responsive to the high pressure of combustion gases fired in said cylinders for opening the passages to conduct jets of the combustion gases to the turbine wheel to effect rotation thereof;
said piston-cylinder combinations being arranged annularly concentric with the axis of said shaft, the axes of said cylinders being parallel to said shaft axis;

a cam wheel mounted on said turbine shaft and having a cam face thereupon facing axially of said shaft; and cam followers connected to said pistons and driven by said cam face to effect positive compression movement of said pistons into said cylinders.

6. A gas turbine engine as defined in claim 5 including:

vane means on said cam wheel for inducting cooling air therethrough and through the central portion of the engine to effect internal cooling thereof; and passages associated with said turbine wheel for exhausting the cooling air into the exhaust gas from the turbine wheel.

7. A gas turbine engine as defined in claim 5 in which:

said cam face having a plurality of nodes and valleys thereon to effect concurrent compressive movements of a number of pistons corresponding to the number of nodes on the cam face;

the total number of firings of compressed fuel-air mixture in the cylinders for each revolution of the shaft being equal to the product of the number of nodes on the cam face multiplied by the number of piston-cylinder combinations.

8. A gas turbine engine as defined in claim 5 in which said cam wheel and piston-cylinder combination array is duplicated at opposite ends of the engine, but reversed in direction so that each cam faces toward the center of the engine;

said turbine wheel being located substantially at the center plane of the engine;

said piston-cylinder combinations being arranged substantially in a circle adjacent the periphery of the engine with said exhaust passages extending axially inwardly of the engine to communicate with turbine passages adjacent the periphery of the turbine wheel.

9. A gas turbine engine as defined in claim 8 in which:

said end plate moving means comprising a pair of complementary cam plates having complementary nodes and valleys thereon; and rolling means for effecting contact between said cam plates; one of said cam plates being driven by said shaft and the other of said cam plates being connected to said end plate to reciprocate therewith.

10. A gas turbine engine comprising:

a turbine wheel;

a shaft mounting said turbine wheel for rotation therewith;

a plurality of piston-cylinder combinations;

means driven by said shaft for effecting longitudinal movement of said pistons in said cylinders;

means supplying a fuel-air mixture to said cylinders;

exhaust passages leading from said cylinders to said turbine wheel;

means normally closing said exhaust passages and responsive to the high pressure of combustion gases fired in said cylinders for opening the passages to conduct jets of the combustion gases to the turbine wheel to effect rotation thereof;

said piston-cylinder combinations being arranged annularly concentric with the axis of said shaft, the axes of said cylinders being parallel to said shaft axis;

said pistons being connected to a common end plate; and means driven by said shaft for effecting axial movement of said end plate to effect concurrent movement of all of the pistons in the same direction at the same time.

References Cited

UNITED STATES PATENTS

| | | | |
|---|---|---|---|
| 2,369,175 | 2/1945 | Prince | 60—13 |
| 2,429,725 | 10/1947 | Kucera | 60—39.8 X |
| 2,647,363 | 8/1953 | Stott | 60—13 |
| 2,856,753 | 10/1958 | Herzog | 60—13 X |
| 3,212,262 | 10/1965 | Pedrick | 60—13 X |
| 3,242,665 | 3/1966 | Flater | 60—13 |

BENJAMIN W. WYCHE III, Primary Examiner

U.S. Cl. X.R.

60—39.8, 39.37